United States Patent [19]

Layh

[11] Patent Number: 4,791,332

[45] Date of Patent: Dec. 13, 1988

[54] ROTOR FOR MOTOR TACHO-GENERATOR

[76] Inventor: Hans-Dieter Layh, Zachersweg 17, D-7121 Gemmrigheim, Fed. Rep. of Germany

[21] Appl. No.: 63,996

[22] Filed: Jun. 19, 1987

[30] Foreign Application Priority Data

Jun. 20, 1986 [DE] Fed. Rep. of Germany ....... 3620798

[51] Int. Cl.⁴ .............................................. H02K 1/22
[52] U.S. Cl. ...................... 310/268; 310/44; 310/171; 310/216
[58] Field of Search ............... 310/216, 217, 268, 218, 310/171, 265, 195, 267, 198, 261, 264, 44; 336/233; 29/598

[56] References Cited

U.S. PATENT DOCUMENTS

| 1,212,544 | 1/1917 | Neuland | 310/195 |
| 2,721,278 | 10/1955 | Baumann | 310/44 |
| 2,913,819 | 11/1959 | Anderotti | 310/44 |
| 3,872,334 | 3/1975 | Loubier | 310/44 |
| 4,264,833 | 4/1981 | Stenudd | 310/268 |

FOREIGN PATENT DOCUMENTS

| 0177181 | 6/1953 | Austria | 310/44 |
| 2232927 | 2/1973 | Fed. Rep. of Germany | 310/44 |
| 1060357 | 11/1953 | France | 310/44 |
| 0003292 | 1/1979 | Japan | 310/44 |
| 0760269 | 10/1956 | United Kingdom | 310/44 |
| 2056073 | 3/1981 | United Kingdom | 310/171 |

Primary Examiner—R. Skudy
Attorney, Agent, or Firm—Barnes & Thornburg

[57] ABSTRACT

A rotor for a techo-generator having an integral, massive disk that is toothed at the outer circumference. The width of the grooves between the teeth is larger than the width of the teeth so that the rotor windings may be wound in one plane without any baffle plates, deflecting plates or the like.

7 Claims, 1 Drawing Sheet

ROTOR FOR MOTOR TACHO-GENERATOR

BACKGROUND AND SUMMARY OF THE INVENTION

The present invention relates to a rotor for tacho-generators, particularly for direct-current tacho-generators, having axial grooves arranged at the rotor circumference for receiving rotor windings which each enclose one or several teeth formed by the grooves at the circumference of the rotor.

Tacho-generators with corresponding rotors are used for generating a voltage that is proportional to the respective speed of the rotor. In direct-current tacho-generators, the voltage generated in the windings by magnetic induction is collected via collectors, by carbon brushes or the like.

In conventional tacho-generators, the rotor consists of a bundle of bars which are arranged axially behind one another. In addition, the teeth formed between the grooves are preferably constructed as so-called pole pieces, so that the grooves narrow in the direction of the outer circumference of the rotor while forming very narrow gaps.

This rotor construction corresponds to the method of construction of power generators. This known construction is therefore optimally designed with respect to the magneto-dynamic conditions.

Because of the narrow gaps between the teeth, the arrangement of the rotor windings becomes extremely difficult. In addition, the generated voltage has harmonic waves so that, as a rule, relatively costly circuit arrangements are required for the smoothing of the voltage. On the whole, the conventional method of construction is therefore costly.

It is an objective of the present invention to provide a rotor that is particularly well suited for tacho-generators and is produced with significantly reduced manufacturing expenditures.

This and other objectives are achieved in the present invention by the provision of a rotor comprising at least one massive disk made of a ferromagnetic material, such as iron or steel, for example. In certain preferred embodiments, the rotor comprises a few corresponding disks.

The invention is based on the recognition that a tacho-generator, in contrast to a power generator, does not have to be designed for a performance that is as high as possible. In contrast, what is important is an optimal quality of the generated voltage, particularly of a direct-current voltage, i.e., the most extensive freedom from harmonic waves and voltage peaks. In addition, a good linearity should exist between the generated voltage and the respective speed, such that the generated voltage rises as linearly as possible with the speed.

This requirement is met much better by the integral and largely homogeneous disks than by a bundle of bars. This is due essentially to the fact that the massive monolithic material of the integral disks can be magnetically reversed only with a comparatively high inertia. This effect that is extremely undesirable in power generators, according to the invention, is therefore utilized for the optimization of a tacho-generator. It is particularly advantageous for the rotor to comprise only one single massive disk.

As a result, an essential advantage is achieved that the costs for the manufacturing of the rotor are reduced considerably. The rotor, according to a preferred embodiment of the invention, may also be manufactured by powder metallurgy.

In addition, in certain preferred embodiments, the grooves, in axial view of the rotor, are clearly wider than the teeth, for example, at least twice as wide. According to a preferred embodiment, the ratio of the widths of the tooth faces to the widths of the grooves are approximately 0.3.

In these embodiments, the arrangement of the coil windings is extremely facilitated. In addition, the quality of the direct current that can be generated is also improved again.

In a particularly preferred embodiment, the tooth profiles, in the area of the outer circumference of the rotor and in axial view of the rotor, are beveled in the corner areas in the manner of chamfers. As a result, it is ensured, in a particularly simple way, that a central radial plane of each rotor winding extends outside the teeth that are directly adjacent to the rotor winding. Because of this construction, the coils may be wound directly onto the rotor, without any deflecting plates and baffle plates or the like.

In order to hold the coil windings on the rotor in a particularly secure way, the tooth profiles of each tooth are sloped in certain preferred embodiments, with respect to one another in axial view of the rotor such that the tooth is slightly widened radially toward the outside.

Other objects, advantages and novel features of the present invention will become apparent from the following detailed description of the invention when considered in conjunction with the accompanying drawings.

DETAILED DESCRIPTION OF THE DRAWINGS

The rotor of the present invention essentially comprises a massive disk 1 that is toothed at its circumference and consists of a ferromagnetic material, such as iron or steel. In principle, this disk may be manufactured in any arbitrary manner. However, powder-metallurgical processes are preferred.

The grooves 3 that are formed between the teeth 2 have an approximately rectangular cross-section. However, the tooth profiles of the teeth 2 are each arranged to be sloped with respect to one another so that the grooves 3 become slightly narrower at width b radially toward the outside.

In the area of the outer circumference of the disk, the profiles of the teeth 2 are beveled at 5 in the manner of chamfers, in which case, the respective slope of the bevel at 5 form an angle Y with the tooth profile that follows.

The width B of the grooves 3 of their bottom considerably larger than the width of the teeth 2. The ratio of the tooth widths D to the widths B of the grooves, according to a preferred embodiment, may be at approximately 0.3.

Figure 1:
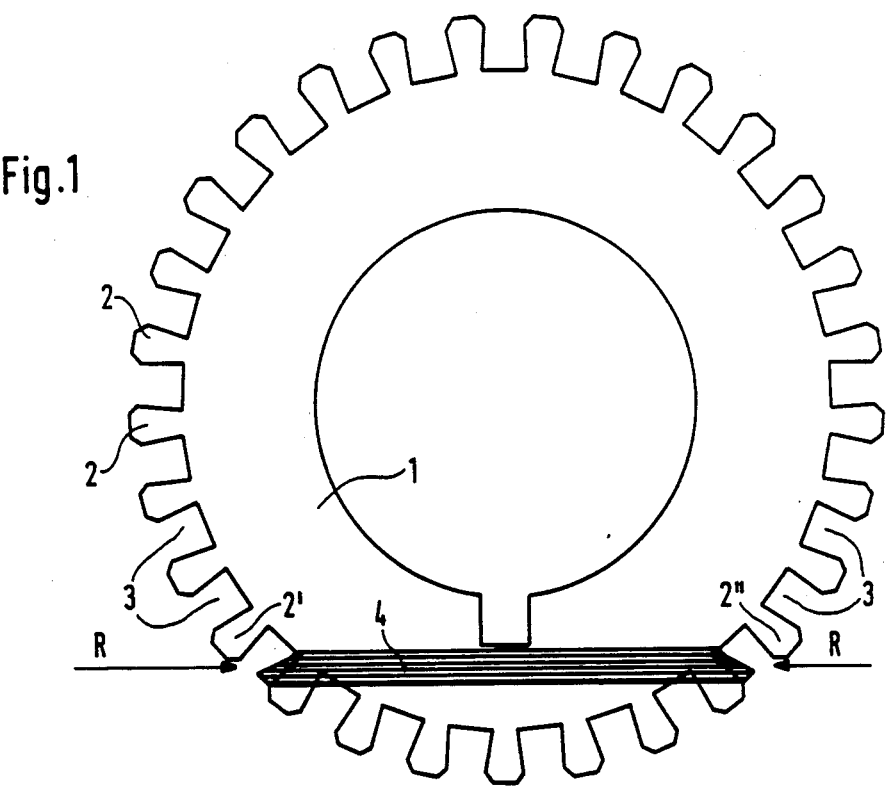
FIG. 1 is an axial view of a disk constructed in accordance with a preferred embodiment of the present invention.
Figure 2:
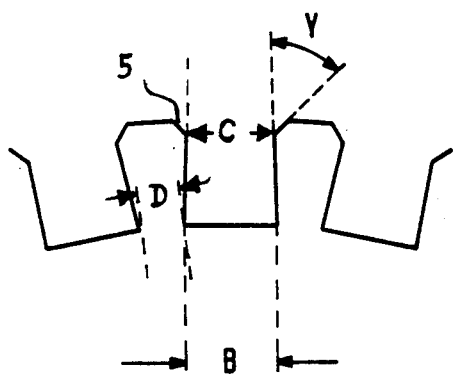
FIG. 2 is a representation of the toothed circumference of the disk in the form of a cutout.

The teeth 2 and the grooves 3 are used for the arrangement of rotor windings 4, of which only one is shown in FIG. 1. Each rotor winding 4 therefore encloses a given number of teeth 2.

Because of the large width of the grooves 3 as well as of the tooth profiles that are sloped in the area of the outer circumference of the disk, a central radial Plane R of each rotor winding 4 extends outside of the teeth 2' and 2" that are directly adjacent toward the outside to the respective winding 4. As shown in FIG. 1, the slopes of the teeth 2' and 2" that face the central radial plane R are approximately parallel to the plane R.

By this arrangement, the windings 4 are arrangeable directly on the disk and no deflecting or baffle plates or the like are required for the applying of the windings.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A rotor for tacho-generator having axially extending teeth and grooves arranged at a rotor circumference, said grooves being defined by a bottom located radially inward from said rotor circumference and adjacent to outwardly extending sides, which sides define sides of said teeth, and wherein said grooves receive rotor windings, wherein said windings enclose at least one of said teeth, the improvement comprising:

that said rotor is formed as a compact disk means;

that said disk means is essentially homogenous ferromagnetic material that carries out magnetic reversal only with considerable inertia;

that said bottom of said grooves in axial view of the disk means has a width at least twice as wide as a width of said teeth at said bottom; and wherein the grooves narrow slightly from the bottom radially outward that each of said teeth in axial view of the disk means have corner area means that are beveled in a chamfer manner to define an angle with an adjacent side of each of said teeth to allow said winding to extend radially toward the outside of said teeth that are directly adjacent the at least one of said teeth and toward the outside of said rotor winding.

2. A rotor according to claim 1, wherein said tacho-generator is a direct-current tacho-generator.

3. A rotor according to claim 2, wherein said ferromagnetic material is as least one of iron and steel.

4. A rotor according to claim 1, wherein said disk means is a powder-metallurgically formed disk.

5. A rotor according to claim 1, wherein a ratio of width of said teeth width to said groove width, in axial view of said disk means, is approximately 0.3.

6. A rotor according to claim 5, wherein the sides of the grooves which define said tooth are sloped toward one another as the sides extend outwardly so that each said tooth widens slightly radially toward the outside.

7. A rotor according to claim 1, wherein the sides of the grooves which define said tooth are sloped toward one another as the sides extend outwardly so that each said tooth widens slightly radially toward the outside.

* * * * *